Aug. 12, 1969 F. S. GUTLEBER 3,461,451

CODE GENERATOR TO PRODUCE PERMUTATIONS OF CODE MATES

Filed Sept. 22, 1967 3 Sheets-Sheet 1

Fig. 1

| EQUATION | CODE | MATE |
|---|---|---|
| 1 | $a, b$ | $a, \bar{b}$ |
| 2 | $b, a$ | $\bar{b}, a$ |
| 3 | $a, \underset{\sim}{b}$ | $a, \underset{\sim}{\bar{b}}$ |
| 4 | $\underset{\sim}{b}, a$ | $\underset{\sim}{\bar{b}}, a$ |
| 5 | $\underset{\sim}{a}, b$ | $\underset{\sim}{a}, \bar{b}$ |
| 6 | $b, \underset{\sim}{a}$ | $\bar{b}, \underset{\sim}{a}$ |
| 7 | $\underset{\sim}{a}, \underset{\sim}{b}$ | $\underset{\sim}{a}, \underset{\sim}{\bar{b}}$ |
| 8 | $\underset{\sim}{b}, \underset{\sim}{a}$ | $\underset{\sim}{\bar{b}}, \underset{\sim}{a}$ |

$\bar{x}$ = COMPLEMENT OF CODE $x$ $\underset{\sim}{x}$ = INVERTED DIGIT SEQUENCE OF CODE $x$

, = BUTT CODES

Fig. 2

| CODE | FORMAT | | | | $N\phi_{aa}(t)$ | | | |
|---|---|---|---|---|---|---|---|---|
| $a$ | 1 | 0 | 0 | 0 | −1 | 0 | +1 | +4 |
| $b$ | 0 | 1 | 0 | 0 | +1 | 0 | −1 | +4 |

Fig. 3

| | | FORMAT | | | | | | | | $N\phi_{aa}(t)$ | | | | | | | |
|---|---|---|---|---|---|---|---|---|---|---|---|---|---|---|---|---|---|
| EQUATION #1 | CODE A | 1 | 0 | 0 | 0 | 0 | 1 | 0 | 0 | −1 | 0 | +3 | 0 | +1 | 0 | +1 | +8 |
| | MATE A' | 1 | 0 | 0 | 0 | 1 | 0 | 1 | 1 | +1 | 0 | −3 | 0 | −1 | 0 | −1 | +8 |
| EQUATION #2 | CODE B | 0 | 1 | 0 | 0 | 1 | 0 | 0 | 0 | +1 | 0 | +1 | 0 | +3 | 0 | −1 | +8 |
| | MATE B' | 1 | 0 | 1 | 1 | 1 | 0 | 0 | 0 | −1 | 0 | −1 | 0 | −3 | 0 | +1 | +8 |
| EQUATION #3 | CODE C | 1 | 0 | 0 | 0 | 0 | 0 | 1 | 0 | −1 | +2 | −1 | 0 | +1 | +2 | +1 | +8 |
| | MATE C' | 1 | 0 | 0 | 0 | 1 | 1 | 0 | 1 | +1 | −2 | +1 | 0 | −1 | −2 | −1 | +8 |
| EQUATION #4 | CODE D | 0 | 0 | 1 | 0 | 1 | 0 | 0 | 0 | +1 | +2 | +1 | 0 | −1 | +2 | −1 | +8 |
| | MATE D' | 1 | 1 | 0 | 1 | 1 | 0 | 0 | 0 | −1 | −2 | −1 | 0 | +1 | −2 | +1 | +8 |
| EQUATION #5 | CODE E | 0 | 0 | 0 | 1 | 0 | 1 | 0 | 0 | +1 | +2 | +1 | 0 | −1 | +2 | −1 | +8 |
| | MATE E' | 0 | 0 | 0 | 1 | 1 | 0 | 1 | 1 | −1 | −2 | −1 | 0 | +1 | −2 | +1 | +8 |
| EQUATION #6 | CODE F | 0 | 1 | 0 | 0 | 0 | 0 | 0 | 1 | −1 | +2 | −1 | 0 | +1 | +2 | +1 | +8 |
| | MATE F' | 1 | 0 | 1 | 1 | 0 | 0 | 0 | 1 | +1 | −2 | +1 | 0 | −1 | −2 | −1 | +8 |
| EQUATION #7 | CODE G | 0 | 0 | 0 | 1 | 0 | 0 | 1 | 0 | +1 | 0 | +1 | 0 | +3 | 0 | −1 | +8 |
| | MATE G' | 0 | 0 | 0 | 1 | 1 | 1 | 0 | 1 | −1 | 0 | −1 | 0 | −3 | 0 | +1 | +8 |
| EQUATION #8 | CODE H | 0 | 0 | 1 | 0 | 0 | 0 | 0 | 1 | −1 | 0 | +3 | 0 | +1 | 0 | +1 | +8 |
| | MATE H' | 1 | 1 | 0 | 1 | 0 | 0 | 0 | 1 | +1 | 0 | −3 | 0 | −1 | 0 | −1 | +8 |

INVENTOR
FRANK S. GUTLEBER
BY Alfred C. Hill
AGENT

CODE GENERATOR TO PRODUCE PERMUTATIONS OF CODE MATES

Filed Sept. 22, 1967 3 Sheets-Sheet 2

INVENTOR
FRANK S. GUTLEBER
BY Alfred C. Hill
AGENT

Aug. 12, 1969 F. S. GUTLEBER 3,461,451

CODE GENERATOR TO PRODUCE PERMUTATIONS OF CODE MATES

Filed Sept. 22, 1967 3 Sheets-Sheet 3

INVENTOR
FRANK S. GUTLEBER
BY Alfred C. Hill
AGENT

United States Patent Office 3,461,451

Patented Aug. 12, 1969

3,461,451

CODE GENERATOR TO PRODUCE PERMUTATIONS OF CODE MATES

Frank S. Gutleber, Wayne, N.J., assignor to International Telephone and Telegraph Corporation, Nutley, N.J., a corporation of Maryland Filed Sept. 22, 1967, Ser. No. 669,899

Int. Cl. H03k 13/02

U.S. Cl. 340—348 10 Claims

ABSTRACT OF THE DISCLOSURE

Pseudonoise multiplexed codes including code mates having correlation functions which upon detection provides an impulse autocorrelation function. The code mates can be increased in number by repeatedly solving the equations of FIG. 1 for the original code mates and the resultant new code mates. The butting process required in the equations is achieved by logic circuitry controlled by a control signal having a period equal to twice the period of the input code mates.

BACKGROUND OF THE INVENTION

This invention relates to pulse signalling systems of the code type and more particularly to an improved autocorrelation technique for use in such pulse signalling systems.

Correlation techniques have been utilized in the past in signal processing systems employing signals in the form of a pulse or sequence of pulses. Such pulse signalling systems include, for example, radiant energy reflecting systems, such as radar, radio range finders, radio altimeters, and the like; pulse communication systems, such as over-the-horizon systems employing various types of scatter techniques, satellite communication systems and the like; and multiple access systems employing address codes to enable utilization of the multiple access system. Correlation techniques when employed in radiant energy reflections systems enhance the resolution of closely spaced reflecting surfaces and in addition, particularly when wide pulse widths are employed, increase the average power transmitted. Correlation techniques employed in pulse communication systems result in increased signal-to-noise ratios without increase of transmitter power and minimize multiple paths affects (fading). Correlation techniques when employed in a multiple access environment also result in increased signal-to-noise ratio without increase of transmitter power and if properly coded prevents or at least minimizes the interference or crosstalk between one or more address codes.

According to prior art correlation techniques the received signal is processed by obtaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform, but rather provide an output whose waveform has spurious peaks in addition to the desired high amplitude peak. The presence of these spurious peaks is undesirable in that the resolving power of radiant energy reflecting systems is reduced, the signal-to-noise ratio of pulse communication systems and multiple access systems and the minimization of multiple path affects the pulse communication systems is reduced to a level below the optimum value.

Previously a number of improved correlation techniques have been proposed that will result in an impulse correlation function. The term "impulse correlation function," and more specifically, impulse autocorrelation function," as employed herein, refers to a waveform having a single high amplitude peak completely free from spurious peaks of lower amplitude elsewhere in waveform.

One of the proposed improved correlation techniques which is related to the present invention is fully disclosed in the copending application of F. S. Gutleber, Ser. No. 645,697, filed June 13, 1967 (hereinafter referred to as "said first copending application"). Said first copending application discloses a class of codes including two codes, termed code mates, where the code mates have cooperating autocorrelation functions so that when they are autocorrelation detected and the resultant detected outputs are linearly added there is provided an impulse autocorrelation function having an impulse output at a given time and a zero output at all other times. The code mates generated are time or frequency multiplexed for transmission to the detector to provide long code sequences to increase the average transmitting power. The transmitted multiplex code mates are separated consistent with the type of multiplexing being employed prior to autocorrelation detection and linear addition. The number of code mates can be increased in accordance with said first copending application by interleaving each of the original code mates and the different time displaced versions thereof to provide a plurality of first codes and interleaving one code mate and the complemented version of the other code mate of each of the original code mates and the different time displaced versions thereof to provide a code mate for each of the first codes. This process of increasing the number and length of code mates can be continued repeatedly with the newly generated code mates to further increase the number and length of code mates.

Another of the proposed improved autocorrelation techniques which is related to the present invention is fully disclosed in the copending application of F. S. Gutleber, Ser. No. 671,382, filed Sept. 28, 1967 (referred to hereinafter as "said second copending application"). Said second copending application discloses another class of codes employing code mates having cooperating autocorrelation functions so that when they are detected and the resultant detected outputs are linearly added together there is provided the desired impulse autocorrelation function. As in said first copending application the code mates generated are time or frequency multiplexed for transmission to the detector to provide long code sequences to increase the average transmitting power. Unlike said first copending application, the code mates of said second copending application do not require complete fill-in but rather may include blank digit time slots of any given number at the end of a code prior to repetition thereof, or the blank slots may be disposed between the first and last time slots which are required to have a digit of either of two conditions, such as binary "1" or "0." The number and length of code mates can be increased in accordance with said second copending application by employing the interleaving processes called for in the equations of FIG. 5 thereof. Each of the new code mates thusly generated may be processed according to the equations of FIG. 5 to form still other new code mates. This process may be continued repeatedly for each new code mate generated to further increase the number and length of code mates.

SUMMARY OF THE INVENTION

An object of the present invention is to provide still another expansion process for any code mates which may be employed in the pseudonoise multiplexed code arrangements of said first copending application.

Another object of the present invention is to provide another expansion process for any code mates, such as disclosed in said first and second copending application.

A further object of the present invention is to provide a system for carrying out the expansion process of the present invention.

A feature of this invention is the provision of a method of generating codes which upon detection will produce an impulse autocorrelation function comprising the steps of generating at least a first code having a first given sequence of code digits and a first autocorrelation function, generating at least a second code having a second sequence of code digits and a second autocorrelation function predeterminedly related to the first autocorrelation function to produce upon detection of the first and second codes the impulse autocorrelation function, butting one of the first and second codes with the other of the first and second codes to produce a third code, complementing the second code, and butting one of the first codes and the complemented second code with the other of the first code and the complemented second code to produce a fourth code, the third and fourth codes forming at least a first new code pair having cooperating autocorrelation functions to produce upon detection of the third and fourth codes the impulse autocorrelation function.

A further feature of this invention is the provision of a system for generating codes which upon detection will produce an impulse autocorrelation function comprising first means to produce a first code and a second code each having a given period and cooperating autocorrelation functions to produce upon detection of the first and second codes the impulse autocorrelation function, second means to produce a control signal having a period equal to twice the given period, at least one third means coupled to the first and second means responsive to the control signal to produce a first output code including one of the first and second codes butted with the other of the first and second codes, and at least one fourth means coupled to the first and second means responsive to the control signal to produce a second output code including one of the first code and the complement of the second code butted with the other of the first code and the complement of the second code, said first and second output codes having cooperating autocorrelation functions to produce upon detection of the first and second output codes the impulse autocorrelation function.

BRIEF DESCRIPTION OF THE DRAWINGS

The above mentioned and other features and objects of this invention will become more apparent by reference to the following description taken in conjunction with the accompanying drawings, in which:

FIG. 1 is a table of equations employed in the expansion process in accordance with the principles of this invention;

FIG. 2 is a table illustrating code mates and their autocorrelation function employed as an example to describe the expansion process of this invention;

FIG. 3 is a table of code mates and their autocorrelation function as produced by the code mates of FIG. 2 when manipulated in accordance with the equations of FIG. 1;

DESCRIPTION OF THE PREFERRED EMBODIMENT

Figure 4:
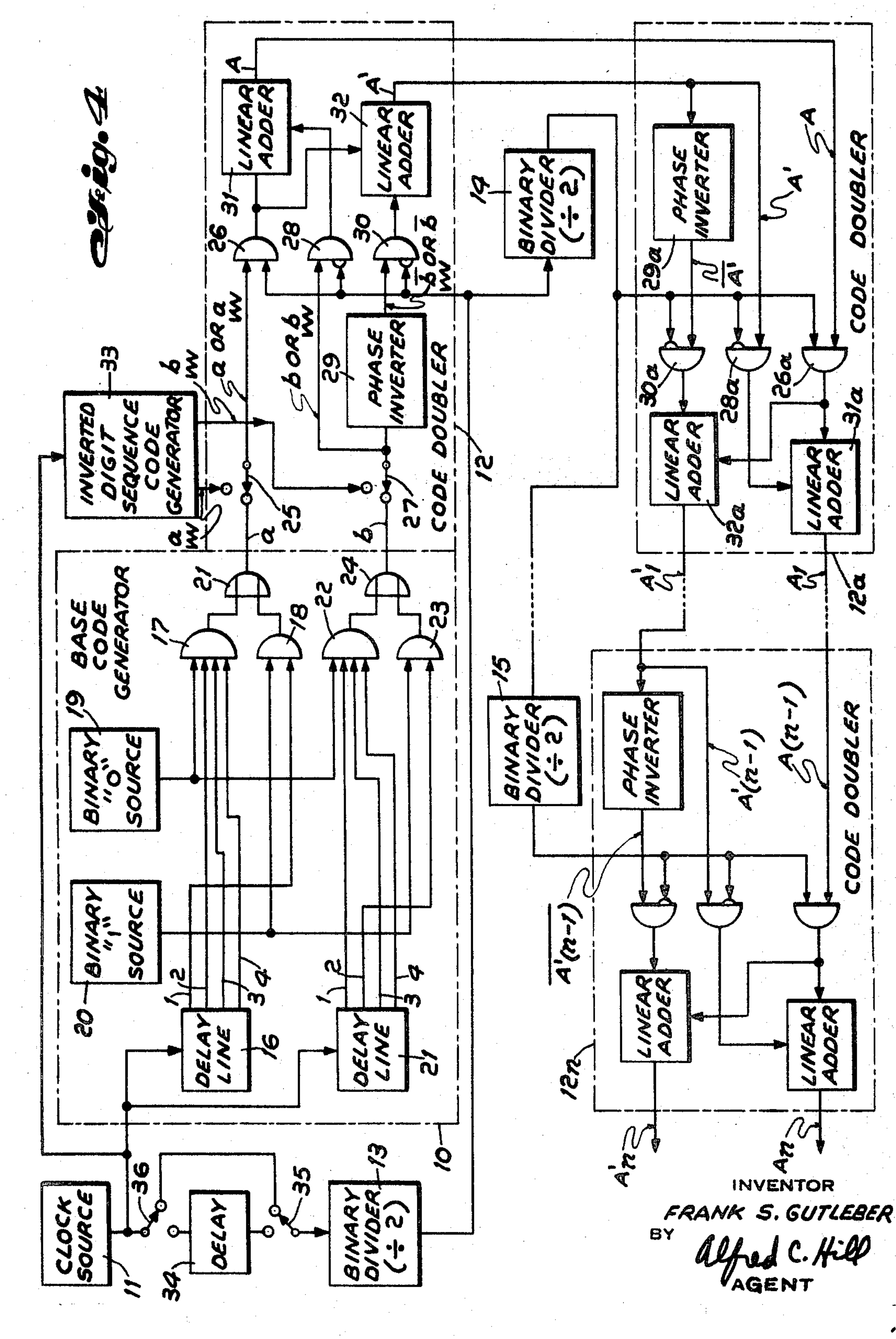
FIG. 4 is a block diagram of a system to carry out the code expansion process in accordance with the principles of this invention.

A code expansion process is disclosed which enables generating an entire impulse autocorrelation function code class from any specified code mates, such as those code mates disclosed in said first and second copending applications. Code mates consist of two codes of length N, where N equals the number of digit time slots of the code, whose autocorrelation functions are zero, or equal in magnitude but opposite in sign for all $t\neq 0$, where $t$ equals the time width of a digit time slot. In accordance with the expansion process of the present invention the code class is generated in the following manner. Let an existing code mate be formed by codes $a$ and $b$. A new code is formed by butting code $b$ against code $a$. The mate for this new code is formed by butting the complement of code $b$ against code $a$. The resulting code mates whose length is twice that of the original code mates will have the necessary requirements for being code mates. That is, the sum of the autocorrelation functions is equal to zero for all $t\neq 0$.

Mathematically, $$\text{Code } a=a_1, a_2, a_3, \ldots, a_N$$
$$\text{Code } b=b_1, b_2, b_3, \ldots, b_N$$

Employing the above codes, a new code A is generated as, $$\text{Code } A=a, b=a_1, a_2, \ldots, a_N, b_1, b_2, \ldots, b_N$$

A mate for code A (code A') is generated as, $$\text{Code } A'=a, \bar{b}=a_1, a_2, \ldots, a_N, \bar{b}_1, \bar{b}_2, \ldots, \bar{b}_N$$

It will now be proven that codes A and A' must form code mates since codes $a$ and $b$ are code mates. The autocorrelation function of code A is given by:

$$\phi(A)=\frac{1}{N}\sum_{i=1}^{i=N-t} a_i a_{(i+t)}+\frac{1}{N}\sum_{i=1}^{i=t} b_i a_{(i+N-t)}+\frac{1}{N}\sum_{i=1}^{i=N-t} b_i b_{(i+t)} \quad (1)$$

for $0\leq t\leq (N-1)$;

$$\phi(a)=\frac{1}{N}\sum_{i=1}^{i=2N-t} a_i b_{(i+t-N)} \quad (2)$$

for $N\leq t\leq (2N-1)$;

$$\phi(a)=0 \quad (3)$$

for $2N\leq t\leq \infty$.

And the autocorrelation function of A' is given by:

$$\phi(A')=\frac{1}{N}\sum_{i=1}^{i=N-t} a_i a_{(i+t)}+\frac{1}{N}\sum_{i=1}^{i=t}\bar{b}_i a_{(i+N-t)}+\frac{1}{N}\sum_{i=1}^{i=N-t}\bar{b}_i\bar{b}_{(i+t)} \quad (4)$$

for $0\leq t\leq (N-1)$;

$$\phi(A')=\frac{1}{N}\sum_{i=1}^{i=2N-t} a_i\bar{b}_{(i+t-N)} \quad (5)$$

for $N\leq t\leq (2N-1)$;

$$\phi(A')=0 \quad (6)$$

for $2N\leq t\leq \infty$.

Since an autocorrelation function is an even function, that is, $\phi(t)=\phi(-t)$, it is not necessary to define $\phi$(A) or $\phi$(A') for negative values of $t$.

The first and last terms of $\phi$(A) and $\phi$(A') for $0\leq t\leq (N-1)$ sum to zero for all $t\neq 0$ since they correspond to the autocorrelation functions of codes $a$ and $b$, or codes $a$ and $\bar{b}$ which by definition form code mates. Hence, the autocorrelation functions of codes A and A' may be simplified to:

$$\phi(A_1)=\frac{1}{N}\sum_{i=1}^{i=t} b_i a_{(i+N-t)} \quad (7)$$

$$\phi(A_1')=\frac{1}{N}\sum_{i=1}^{i=t}\bar{b}_i a_{(i+N-t)} \quad (8)$$

for $0\leq t\leq (N-1)$.

And $$\phi(A_2)=\frac{1}{N}\sum_{i=1}^{i=2N-t} a_i b_{(i+t-N)} \quad (9)$$

$$\phi(A_2')=\frac{1}{N}\sum_{i=1}^{i=2N-t} a_i \bar{b}_{(i+t-N)} \quad (10)$$

for $N \leq t \leq (2N-1)$, where the subscripts 1 and 2 identify the regions of $t$ for which the equation apply.

Now, since $$a_i b_j = -a_i \bar{b}_j \quad (11)$$

Hence, $$\phi(A_1) = -\phi(A'_1) \text{ for all } t \neq 0 \quad (12)$$

$$\phi(A_2) = -\phi(A'_2) \text{ for all } t \neq 0 \quad (13)$$

Therefore, codes A and A′ must form code mates.

According to the present invention eight code mates of length 2N may be generated from each code mates of length N. This is accomplished by employing the equations of FIG. 1. It will be observed that, since it does not matter which of codes $a$ and $b$ begins the structure of the generated code, two new code mates may be generated from Equations #1 and #2. Also, since any code of given digit sequence and a code having an inversed digit sequence have the same autocorrelation function, six more new code mates may be generated from the codes $a$ and $b$ utilizing an inversed digit sequence for one or both of the codes as expressed in Equations #3 through #8.

The expansion process in accordance with the principles of this invention may be demonstrated with an example. FIG. 2 illustrates code mates along with the required cooperating autocorrelation functions $\phi_{aa}(t)$ times $N$. From these two codes $a$ and $b$, the following is obtained:

$$\bar{b}=1011$$
$$\underset{\leftrightarrow}{a}=0001$$
$$\underset{\leftrightarrow}{b}=0010$$
$$\underset{\leftrightarrow}{\bar{b}}=1101$$

Utilizing the codes shown in FIG. 2 and the codes hereinabove in conjunction with the equations of FIG. 1, there is obtained eight new code mates which are illustrated in FIG. 3 along with their autocorrelation function $\phi_{aa}(t)$ times $N$.

An examination of the codes and their autocorrelation functions of FIG. 3 does indeed demonstrate that the codes and their mates are code mates meeting the requirements to produce an impulse autocorrelation function. The number of code mates can be further increased by the doubling process illustrated by the equations of FIG. 1 by repeatedly solving these equations for each new code mates. Thus, there can be provided a very large quantity of available optimum codes with only moderate time bandwidth products.

Referring to FIG. 4, there is illustrated therein a system to repeatedly carry out the processes defined by the equations of FIG. 1. This system includes base code generator 10 controlled by clock pulses from source 11 to produce codes $a$ and $b$. A tandem arrangement of identical code doublers 12 to 12$n$ operates on the resultant code mates to produce therefrom new code mates having twice the code length. Clock source 11 provides clock pulses having a repetition period T equal to the length of the codes to be generated in generator 10. There is coupled to source 11 a frequency divider chain illustrated by binary dividers 13, 14 and 15 which provide the proper control signal to control the operation of the associated code doubler 12. The control signal from the frequency divider chain must have a period equal to twice the period of the input code to the associated code doubler.

Generator 10 for purposes of illustration includes delay line 16 and four delay line taps extending therefrom which are appropriately connected to AND gates 17 and 18. Binary "0" source 19 is coupled to AND gate 17 and binary "1" source 20 is coupled to AND gate 18. The connection between the delay line taps of delay line 16 and AND gates 17 and 18 produces code $a$, FIG. 2, at the output of OR gate 21. Code $b$ of FIG. 2 is provided in generator 10 by delay line 21 having four delay taps therealong appropriately connected to AND gates 22 and 23. AND gate 22 is connected to source 19 and AND gate 23 is connected to source 20 to produce code $b$, FIG. 2, at the output of OR gate 24. The output of source 11 and the generated output from OR gates 21 and 24 are illustrated in curves A, B and C, respectively, of FIG. 5.

One form of generator 10 has been illustrated in FIG. 4, but it should be noted that there are many different types of code word generators that may be substituted therefor. For instance, the two code word generators of generator 10 may be in accordance with any one of the code word generators illustrated in FIGS. 15, 17 and 19 of said second copending application, or any appropriate variations thereof. It should be noted, however, these generators of said second copending application require a clock pulse having the bit rate rather than the code rate. This can be provided in FIG. 4 by appropriately changing the frequency output of source 11 and providing proper frequency dividers between source 11 and divider 13 to ensure that the control signals to doublers 12 meet the frequency requirement to carry out the present invention.

With switch 25 in the position illustrated, code A is coupled to AND gate 26. With switch 27 in the position illustrated, code $b$ is coupled directly to INHIBIT gate 28 and additionally through phase inverter 29 to INHIBIT gate 30. The output of inverter 29 is illustrated in curve D, FIG. 5. The control signal used to control AND gate 26 and INHIBIT gates 28 and 30 is derived from binary divider 13 and is illustrated in curve E, FIG. 5. Under the control of this control signal, linear adder 31 produces code A as illustrated in curve F, FIG. 5. Likewise, linear adder 32 produces code A′ by the linear addition of the outputs of AND gate 26 and INHIBIT gate 30 as illustrated in curve G, FIG. 5. These two new codes are coupled to code doubler 12$a$ with code A′ being coupled to phase inverter 29$a$ to produce at the output thereof the code sequence illustrated in curve H, FIG. 5. Code A′ is likewise coupled directly to INHIBIT gate 28$a$. Code A is coupled to AND gate 26$a$. The control signal for AND gate 26$a$ and INHIBIT gates 28$a$ and 30$a$ is obtained from binary divider 14 and has the timing illustrated in curve I, FIG. 5. Linear adder 31$a$ combines the output of INHIBIT gate 28$a$ and AND gate 26$a$ to produce the new code $A_1$ as illustrated in curve J, FIG. 5. Linear adder 32$a$ combines the output of AND gate 26$a$ and INHIBIT gate 30$a$ to produce the mate code $A_1'$ for new code $A_1$ as illustrated in curve K, FIG. 5.

Besides base code generator 10, the system of FIG. 4 includes code generator 33 which provides two codes, one code having a digit sequence inverted with respect to the digit sequence of code A and the other code having a digit sequence inverted with respect to the digit sequence of code B. Since with switches 25 and 27 in the position illustrated, only Equation #1 can be satisfied, it is possible by manipulating switches 25 and 27 to satisfy Equations #3, 5 and 7 with the switches 25 and 27 being coupled to the appropriate terminal to meet the requirements of these equations.

Figure 5:
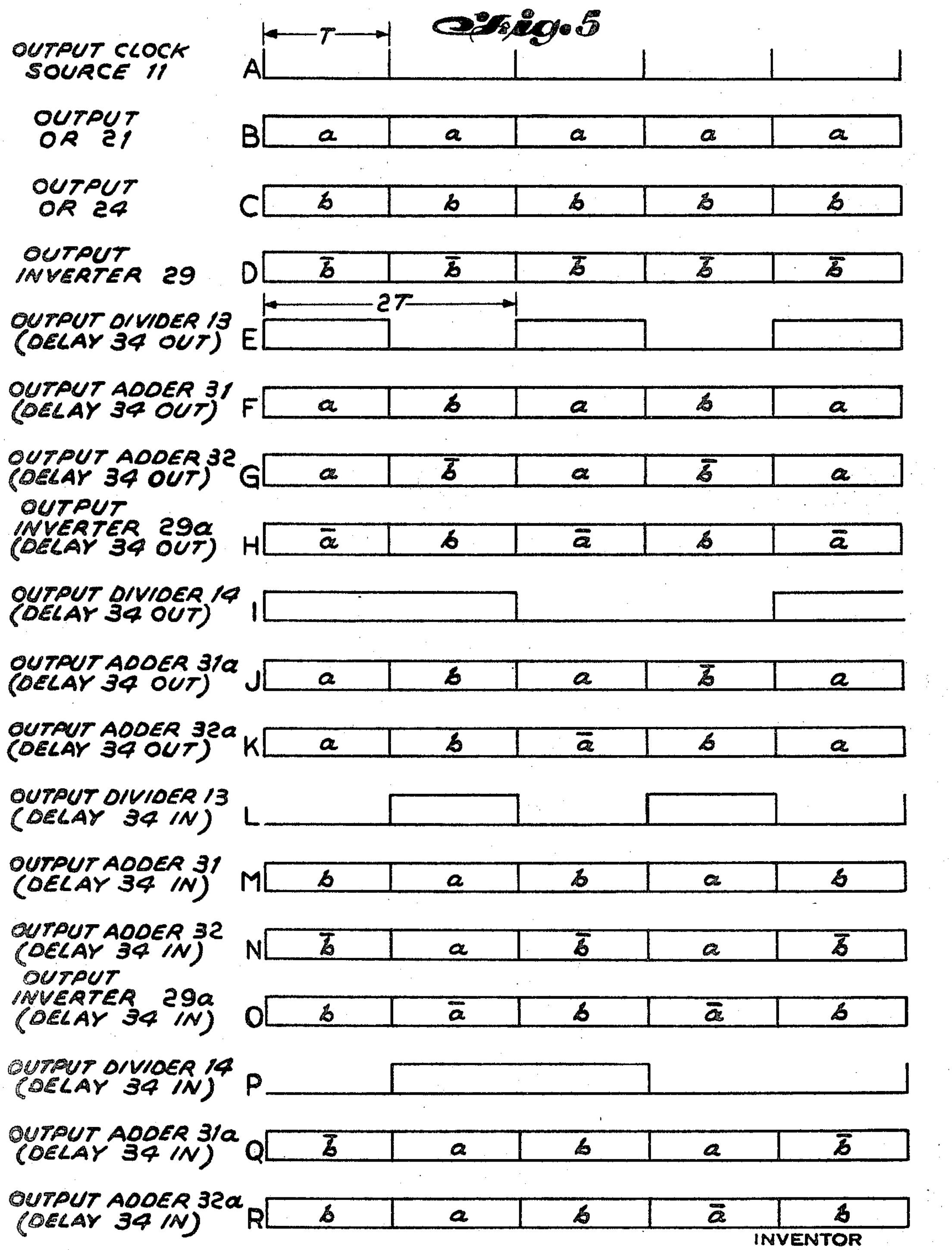
FIG. 5 is a timing diagram illustrating the operation of the system of FIG. 4.

As previously mentioned and as is illustrated by the equations of FIG. 1, it makes no difference which base code starts the now code sequence. To cause code B to precede code A, switches 35 and 36 are manipulated to place delay 34 in the frequency divider chain. Delay 34 should have a delay equal to T so that the control signal at the output of divider 13 has the timing illustrated in curve L, FIG. 5 and the output from divider 14 has the timing illustrated in curve P, FIG. 5. With delay line 34 in the circuit and switches 25 and 27 in the position indicated, the output from adders 31 and 32 will now have the form illustrated in curves M and N, FIG. 5, respectively. Curve O, FIG. 5, illustrates the output of inverter 29*a*. Curves Q and R, FIG. 5, respectively, illustrate the output of address 31*a* and 32*a*. As previously mentioned with respect to generator 33 and switches 25 and 27, it will be possible by proper manipulations of switches 25 and 27 to achieve the generation of codes and their respective mates as defined by Equations #2, #4, #6 and #8.

It should be apparent that the control signal for each code doubler is a clamped square wave taken from the frequency divider chain at such a point that the period of the control signal is twice the period of the input codes to the particular code doubler under consideration.

While I have described above the principles of my invention in connection with specific apparatus it is to be clearly understood that this description is made only by way of example and not as a limitation to the scope of my invention as set forth in the objects thereof and in the accompanying claims.

I claim:

1. A system for generating codes which upon detection will produce an impulse autocorrelation function comprising:

first means to produce a first code and a second code each having a given period and cooperating autocorrelation functions to produce upon detection of said first and second codes said impulse autocorrelation function including an impulse output at a given time and a zero output at all other times;

second means to produce a control signal having a period equal to twice said given period;

at least one third means coupled to said first and second means responsive to said control signal to produce a first output code including one of said first and second codes butted with the other of said first and second codes; and at least one fourth means coupled to said first and second means responsive to said control signal to produce a second output code including one of said first code and the complement of said second code butted with the other of said first code and the complement of said second code;

said first and second output codes having cooperating autocorrelation functions to produce upon detection of said first and second output codes said impulse autocorrelation function.

2. A system according to claim 1, wherein said third means includes an AND gate coupled to said first means and said second means responsive to said first code and said control signal, a first INHIBIT gate having an inhibit terminal and an input terminal, said inhibit terminal being coupled to said second means responsive to said control signal and said input terminal being coupled to said first means responsive to said second code, and a first linear adder coupled to said AND gate and said first INHIBIT gate to produce said first output code; and said fourth means includes a phase inverter coupled to said first means responsive to said second code, a second INHIBIT gate having an inhibit terminal and an input terminal, said inhibit terminal being coupled to said second means responsive to said control signal and said input terminal being coupled to said phase inverter, and a second linear adder coupled to said AND gate and said second INHIBIT gate to produce said second output code.

3. A system according to claim 1, including a plurality of third means coupled in tandem to said first means and each other;

a plurality of fourth means coupled in tandem to said first means and each other;

fifth means coupled to said second means to produce a different control signal for each of said third and fourth means, said control signal coupled to an associated one of said third and fourth means having a period twice the period of said first and second output codes of the preceding one of said third and fourth means;

each of said third means except the first of said third means producing said first output signal including one of said first and second output codes of the preceding one of said third and fourth means butted with the other of said first and second output codes of said preceding one of said third and fourth means; and each of said fourth means except the first of said fourth means producing said second output signal including one of said first output code and the complement of said second output code of the preceding one of said third and fourth means butted with the other of said first output code and the complement of said second output code of the preceding one of said third and fourth means.

4. A system according to claim 3, wherein each of said third means includes an AND gate coupled to said first means and said second means responsive to said first code and said control signal, a first INHIBIT gate having an inhibit terminal and an input terminal, said inhibit terminal being coupled to said second means responsive to said control signal and said input terminal being coupled to said first means responsive to said second code, and a first linear adder coupled to said AND gate and said first INHIBIT gate to produce said first output code; and each of said fourth means includes a phase inverter coupled to said first means responsive to said second code, a second INHIBIT gate having an inhibit terminal and an input terminal, said inhibit terminal being coupled to said second means responsive to said control signal and said input terminal being coupled to said phase inverter, and a second linear adder coupled to said AND gate and said second INHIBIT gate to produce said second output code.

5. A system according to claim 1, further including fifth means to produce at least a third code having an autocorrelation function identical with the autocorrelation function of said first code and a sequence of code digits inverted with respect to the code digits of said first code; and sixth means coupled to said first, third, fourth and fifth means to disconnect said first code from the input of said third and fourth means and to connect said third code to the input of said third and fourth means to cause said third means to produce said first output code including one of said second and third codes butted with the other of said second and third codes and to cause said fourth means to produce said second output code including one of said complemented second code and said third code butted with the other of said complemented second code and said third code.

6. A system according to claim 5, including a plurality of third means coupled in tandem to said first and sixth means and each other;

a plurality of fourth means coupled in tandem to said first and sixth means and each other;

seventh means coupled to said second means to produce a different control signal for each of said third and fourth means, said control signal coupled to an associated one of said third and fourth means having a period twice the period of said first and second output codes of the preceding one of said third and fourth means;

each of said third means except the first of said third means producing said first output signal including one of said first and second output codes of the preceding one of said third and fourth means butted with the other of said first and second output codes of said preceding one of said third and fourth means butted with the other of said first and second output codes of said preceding one of said third and fourth means; and each of said fourth means except the first of said fourth means producing said second output signal including one of said first output code and the complement of said second output code of the preceding one of said third and fourth means butted with the other of said first output code and the complement of said second output code of the preceding one of said third and fourth means.

7. A system according to claim 1, further including fifth means to produce at least a third code having an autocorrelation function identical with the autocorrelation function of said second code and a sequence of code digits inverted with respect to the code digits of said second code; and sixth means coupled to said first, third, fourth and fifth means to disconnect said second code from the input of said third and fourth means and to connect said third code to the input of said third and fourth means to cause said third means to produce said first output code including one of said first and third codes butted with the other of said first and third codes and to cause said fourth means to produce said second output code including one of said first code and the complement of said third code butted with the other of said first code and the complement of said third code.

8. A system according to claim 7, including a plurality of third means coupled in tandem to said first and sixth means and each other;

a plurality of fourth means coupled in tandem to said first and sixth means and each other;

seventh means coupled to said second means to produce a different control signal for each of said third and fourth means, said control signal coupled to an associated one of said third and fourth means having a period twice the period of said first and second output codes of the preceding one of said third and fourth means;

each of said third means except the first of said third means producing said first output signal including one of said first and second output codes of the preceding one of said third and fourth means butted with the other of said first and second output codes of said preceding one of said third and fourth means; and each of said fourth means except the first of said fourth means producing said second output signal including one of said first output code and the complement of said second output code of the preceding one of said third and fourth means butted with the other of said first output code and the complement of said second output code of the preceding one of said third and fourth means.

9. A system according to claim 1, further including fifth means to produce at least a third code and a fourth code, said third code having an autocorrelation function identical with the autocorrelation function of said first code and a sequence of code digits inverted with respect to the code digits of said first code and, said fourth code having an autocorrelation function identical with the autocorrelation function of said second code and a sequence of code digits inverted with respect to the code digits of said second code; and sixth means coupled to said first, third, fourth and fifth means to disconnect said first and second codes from the input of said third and fourth means and to connect said third and fourth codes to the input of said third and fourth means to cause said third means to produce said first output code including one of said third and fourth codes butted with the other of said third and fourth codes and to cause said fourth means to produce said second output code including one of said third code and the complement of said fourth code butted with the other of said third code and the complement of said fourth code.

10. A system according to claim 9, including a plurality of third means coupled in tandem to said sixth means and each other;

a plurality of fourth means coupled in tandem to said sixth means and each other;

seventh means coupled to said second means to produce a different control signal for each of said third and fourth means, said control signal coupled to an associated one of said third and fourth means having a period twice the period of said first and second output codes of the preceding one of said third and fourth means;

each of said third means except the first of said third means producing said first output signal including one of said first and second output codes of the preceding one of said third and fourth means butted with the other of said first and second output codes of said preceding one of said third and fourth means; and each of said fourth means except the first of said fourth means producing said second output signal including one of said first output code and the complement of said second output code of the preceding one of said third and fourth means butted with the other of said first output code and the complement of said second output code of the preceding one of said third and fourth means.

References Cited

UNITED STATES PATENTS

| | | | |
|---|---|---|---|
| 3,173,139 | 3/1965 | Welti | 343—17.1 |
| 3,208,065 | 9/1965 | Gutleber et al. | 343—17.1 |

CHARLES L. WHITHAM, Primary Examiner

U.S. Cl. X.R.

343—17